(12) United States Patent
Koide et al.

(10) Patent No.: US 6,433,820 B1
(45) Date of Patent: Aug. 13, 2002

(54) IMAGE PICKUP SYSTEM AND STORAGE MEDIUM

(75) Inventors: Yuji Koide, Kawasaki; Masayoshi Sekine, Tokyo; Makoto Hiramatsu, Yamato; Takashi Aizawa, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/067,334

(22) Filed: Apr. 28, 1998

(30) Foreign Application Priority Data

May 1, 1997 (JP) .............................................. 9-114015

(51) Int. Cl.[7] .......................... H04N 5/76; H04N 7/00; H04N 5/232; H04B 1/66
(52) U.S. Cl. ........................ 348/231; 348/232; 348/552; 348/211; 375/240
(58) Field of Search ................................ 348/231, 552, 348/211, 14.08, 232, 233; 375/240

(56) References Cited

U.S. PATENT DOCUMENTS

| | | | | |
|---|---|---|---|---|
| 4,322,752 A | * | 3/1982 | Bixby ........................ 358/213 |
| 4,339,775 A | * | 7/1982 | Lemke et al. ................. 360/10 |
| 4,660,096 A | * | 4/1987 | Arlan et al. ................. 358/310 |
| 4,785,353 A | * | 11/1988 | Seim ...................... 358/213.26 |
| 5,285,286 A | * | 2/1994 | Kannegundla ............... 348/187 |
| 5,412,422 A | * | 5/1995 | Yamada et al. ............. 348/218 |
| 5,581,311 A | * | 12/1996 | Kuroiwa ..................... 348/231 |
| 5,680,151 A | * | 10/1997 | Grimm et al. .............. 348/552 |
| 5,920,343 A | * | 7/1999 | Watanabe et al. ........... 348/231 |
| 5,986,699 A | * | 11/1999 | Nishihara ................... 348/231 |
| 6,075,897 A | * | 6/2000 | Kosugi ....................... 382/232 |
| 6,111,605 A | * | 8/2000 | Suzuki ....................... 348/552 |

* cited by examiner

Primary Examiner—Wendy R. Garber
Assistant Examiner—John M Villecco
(74) Attorney, Agent, or Firm—Morgan & Finnegan LLP

(57) ABSTRACT

To provide a high-performance image pickup system capable of reducing an image area and effectively using a memory, in transfer of one-frame image data from an image pickup device to an image processing circuit, the one-frame image data is divided into a plurality of blocks, and the blocks are transferred. The image processing circuit temporarily stores the one-block image data in a memory circuit and performs predetermined image processing of the stored one-block image data. The image processing circuit then temporarily stores the next one-block image data in the memory circuit and performs predetermined image processing for this stored one-block image data. The predetermined image processing can be performed in units of blocks. The necessary image area can have a capacity of at least one block in the memory circuit in the image processing circuit.

14 Claims, 4 Drawing Sheets

| BLOCK SIZE | CAPACITY (BYTE) OF ONE BLOCK | NUMBER OF BLOCKS |
|---|---|---|
| 320 PIXELS × 8 PIXELS | 5, 120 | 30 |
| 320 PIXELS × 16 PIXELS | 10, 240 | 15 |
| 320 PIXELS × 24 PIXELS | 15, 360 | 10 |
| 320 PIXELS × 48 PIXELS | 30, 720 | 5 |
| 320 PIXELS × 120 PIXELS | 76, 800 | 2 |
| 320 PIXELS × 240 PIXELS | 153, 600 | 1 |

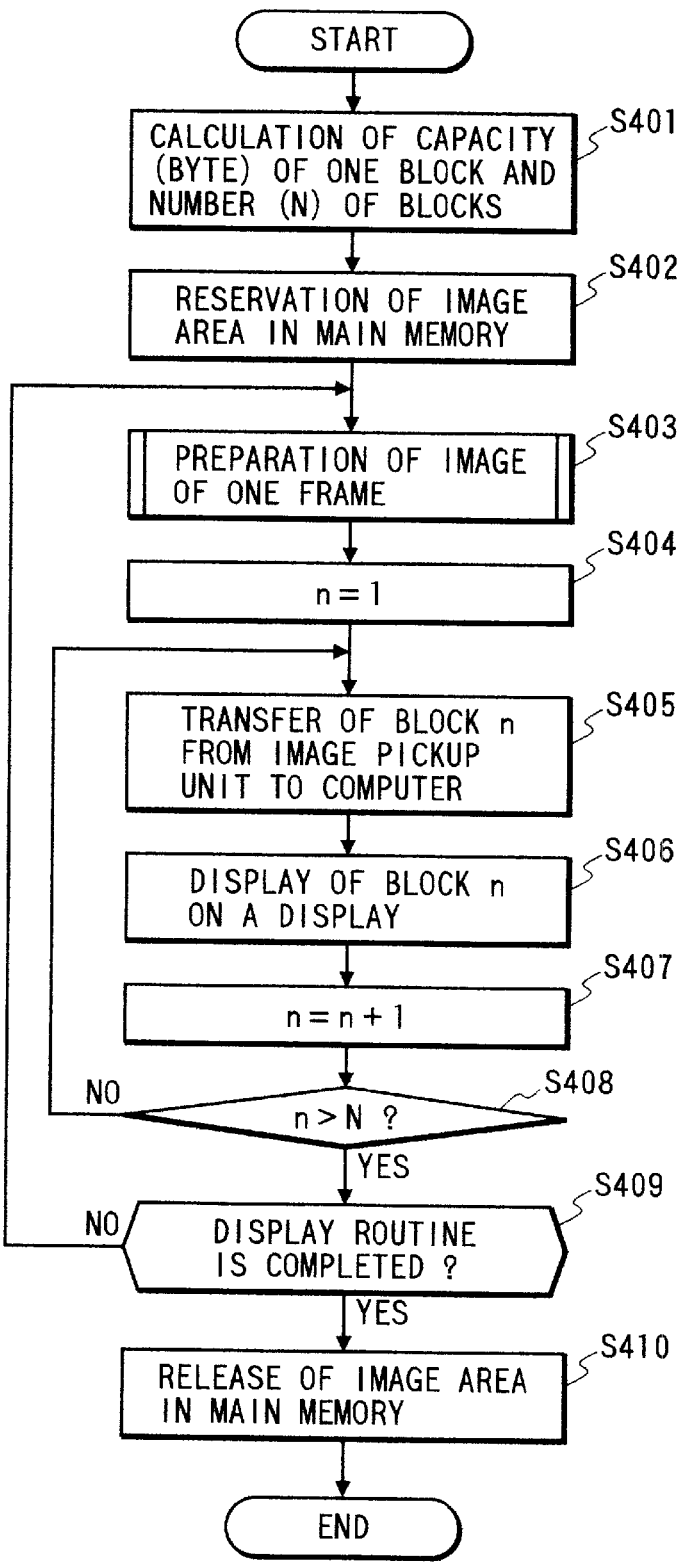

IMAGE PICKUP SYSTEM AND STORAGE MEDIUM

BACKGROUND OF THE INVENTION

1. Field of the Invention

The present invention relates to an image pickup system applied to an image processing system or the like for transferring, to a computer, image data picked up by an image pickup device in accordance with an image pickup program, and performing predetermined image processing in the computer, and a storage medium storing the image pickup program.

2. Related Background Art

Conventionally, an image processing system constituted by an image pickup device (image pickup unit) and a computer connected to the image pickup device is available.

In this image processing system, the computer executes an image pickup program for controlling data transfer from the image pickup device to the computer and various kinds of processing in the computer. Various kinds of image processing can be performed in the image processing system. For example, image data picked up by the image pickup device is transferred to the computer and displayed on the screen of the computer, or the image data is compressed and stored as an image file in a memory.

In the above conventional image processing system, the image data obtained by the image pickup device is transferred to the computer in units of frames.

More specifically, the memory of the image pickup device temporarily stores one-frame image data expressed by a luminance signal/color difference signals, which represent a 320 (pixels in the horizontal direction)×240 (pixels in the vertical direction) size obtained upon image pickup, or one-frame image data expressed in the form of R (5 bits), G (5 bits), and B (5 bits), which represent a 160 (pixels in the horizontal direction)×120 (pixels in the vertical direction) size. The image data is then transferred from the memory of the image pickup device to the main memory of the computer in units of frames.

In the conventional image processing system, when image data expressed by the 2-byte luminance signal/color difference signals per pixel in the 320 (pixels in the horizontal direction)×240 (pixels in the vertical direction) size is to be processed, the main memory of the computer must have at least one-frame image data empty area, i.e., a 153,600-byte image area in addition to the work area for executing the image pickup program described above.

In transfer of one-frame image data from the image pickup device to the computer, when the empty area of the main memory of the computer cannot store one-frame image data, the image pickup program cannot be executed, thus degrading the performance of the overall system.

SUMMARY OF THE INVENTION

The present invention has been made to eliminate the above drawback, and has as its object to provide a high-performance image pickup system which has a small image area and effectively uses a memory.

It is another object of the present invention to provide an image pickup program capable of reducing an image pickup system image area to effectively use a memory and attaining a high-performance image pickup system.

According to the first aspect of the present invention, there is provided an image pickup system comprising image pickup means for picking up an object image to obtain image data, image processing means, connectable to the image pickup means through communication means, for temporarily storing the image data transferred from the image pickup means in memory means and performing predetermined image processing for the image data, and transfer control means for controlling data transfer between the image pickup means and the image processing means, wherein the transfer control means divides one-frame image data obtained by the image pickup means into a plurality of blocks and transferring the block to the image processing means.

According to the second aspect, the communication means in the first aspect complies with PC card standards.

According to the third aspect, the transfer control means in the first aspect divides the one-frame image data into rectangular blocks each having an integer multiple of 8 pixels in a horizontal direction and 8 pixels in a vertical direction.

According to the fourth aspect, the transfer control means in the first aspect divides the one-frame image data into rectangular blocks each having the number of horizontal pixels of the one-frame image data in a horizontal direction and an integer multiple of 8 pixels in a vertical direction.

According to the fifth aspect, the image processing means in the first aspect comprises storage means for storing the image data from the image pickup means in a memory, and the transfer control means in the first aspect controls to transfer next image data to the image processing means when the image processing means temporarily stores the one-block image data in the memory means and the storage means completes storage in the memory.

According to the sixth aspect, the storage means in the fifth aspect stores the image data upon compression of the one-block image data.

According to the seventh aspect, the image processing means in the first aspect comprises display means for displaying the image data from the image pickup means on a screen, and the transfer control means in the first aspect controls to transfer next image data to the image processing means when the image processing means temporarily stores the one-block image data in the memory means and the image data is displayed on the screen of the display means.

According to the eighth aspect, the transfer control means in the first aspect comprises detection means for detecting a capacity of an empty area of the memory means and changes a size of one block in accordance with a detection result from the detection means.

According to the ninth aspect, there is provided a storage medium which stores a transfer control processing step for transferring image data obtained by picking up an object image by image pickup means to memory means of image processing means connectable to the image pickup means through communication means, temporarily storing the image data in the memory means, and causing the image processing means to perform predetermined image processing, wherein the transfer control processing step includes a processing step of dividing one-frame image data obtained by the image pickup means into a plurality of blocks and transferring the block to the image processing means.

According to the tenth aspect, the transfer control processing step in the ninth aspect includes a processing step of causing the communication means complying with PC card standards to transfer the image data.

According to the eleventh aspect, the transfer control processing step in the ninth aspect includes a processing step of dividing the one-frame image data into rectangular blocks each having an integer multiple of 8 pixels in a horizontal direction and 8 pixels in a vertical direction.

According to the twelfth aspect, the transfer control processing step in the ninth aspect includes a processing step of dividing the one-frame image data into rectangular blocks each having the number of horizontal pixels of the one-frame image data in a horizontal direction and an integer multiple of 8 pixels in a vertical direction.

According to the thirteenth aspect, the transfer control processing step in the ninth aspect includes a processing step of controlling to transfer next image data to the image processing means when the image processing means temporarily stores the one-block image data in the memory means and storage in the memory by the storage means is completed.

According to the fourteenth aspect, the transfer control processing step in the thirteenth aspect includes a processing step of storing the image data upon compression of the one-block image data by the storage means.

According to the fifteenth aspect, the transfer control processing step in the ninth aspect includes a processing step of controlling to transfer next image data to the image processing means when the image processing means temporarily stores the one-block image data in the memory means and the image data is displayed on the screen of display means.

According to the sixteenth aspect, the transfer control processing step in the ninth aspect includes a processing step of detecting a capacity of an empty area of the memory means and changing a size of one block in accordance with a detection result from the detection means.

Other objects, features, and advantages of the invention will become apparent from the following detailed description taken in conjunction with the accompanying drawings.

BRIEF DESCRIPTION OF THE DRAWINGS

FIG. 4 is a flow chart for explaining an image pickup program executed in the above image processing system in the second embodiment.

DESCRIPTION OF THE PREFERRED EMBODIMENTS

The preferred embodiments of the present invention will be described below with reference to the accompanying drawings.

The first embodiment will be described below.

Figure 1:
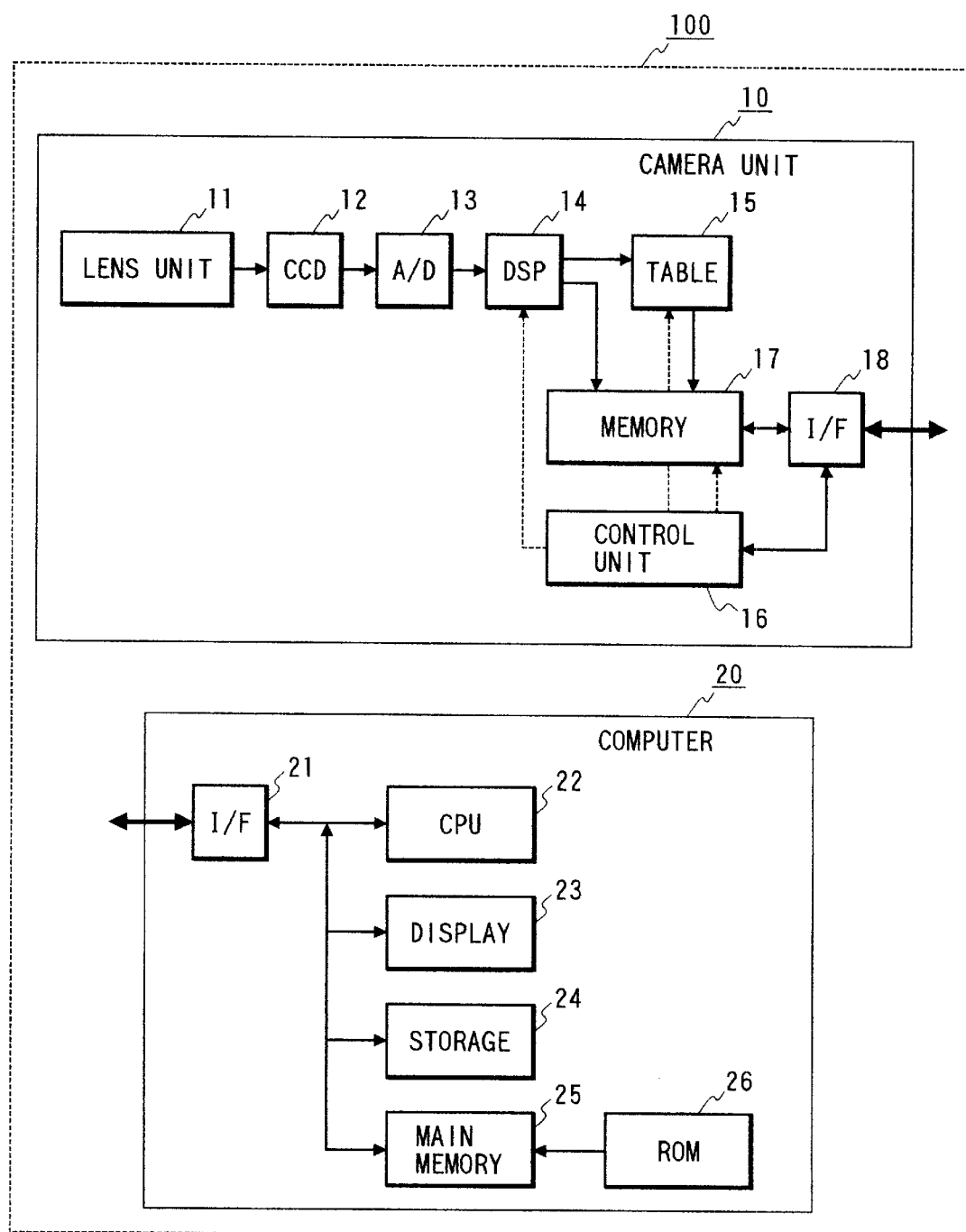
FIG. 1 is a block diagram showing the arrangement of an image processing system to which an image pickup system according to the present invention is applied in the first embodiment.

An image pickup system according to the present invention is applied to an image processing system 100 shown in FIG. 1.

As shown in FIG. 1, the image processing system 100 comprises an image pickup device (image pickup unit) 10 and a computer 20. The image pickup device 10 is connected to the computer 20.

The image pickup device 10 comprises a lens unit 11, an image pickup element 12 on which exit light from the lens unit 11 is focused, an analog-to-digital (A/D) converter 13 for receiving an output from the image pickup element 12, an image pickup signal processing unit 14 for receiving an output from the A/D converter 13, and a conversion table 15 and a memory 17 which receives an output from the image pickup signal processing unit 14.

The image pickup device 10 also comprises a control unit 16 for controlling the image pickup signal processing, unit 14, the conversion table 15, and the memory 17, and an external connection interface (I/F) circuit 18 connected to the memory 17 and the control unit 16.

The computer 20 comprises: an external connection interface (I/F) circuit 21; a CPU (Central Processing Unit) 22, a display 23, and a storage 24 which are connected to the I/F circuit 21; a main memory 25 for outputting data to the CPU 22; and an internal memory 26 such as a ROM (Read Only Memory) for outputting data to the main memory 25.

In the image processing system 100 having the above arrangement, an image pickup program is preset in the internal memory 26 in the computer 20. The computer 20 executes this image pickup program to transfer image data obtained by the image pickup device 10 to the computer 20. The computer 20 then performs predetermined image processing.

Note that the image pickup program will be described in detail later, and the memory according to the present invention is applied as the internal memory 26 which stores this image pickup program.

The internal memory 26 is arranged in the computer 20. However, the memory may be arranged outside the computer 20 as an external memory.

A series of operations of the image processing system 100 will be described below.

Light from an object (not shown) is focused on the image pickup surface of the image pickup element 12 through the lens unit 11 in the image pickup device 10.

The image pickup element 12 comprises, e.g., a CCD (Charge Coupled Device) which photoelectrically converts light (image pickup image information) from the lens unit 11 and accumulates it as charges.

The A/D converter 13 sequentially reads the charges accumulated for all the pixels on the image pickup surface in the image pickup element 12, converts them into digital data, and supplies the digital data to the image pickup signal processing unit 14.

The image pickup signal processing unit 14 comprises, e.g., a DSP (Digital Signal Processor) which performs predetermined signal processing for the image data from the A/D converter 13 to convert it into luminance/color difference data under the control of the control unit 16.

Of the luminance/color difference data from the image pickup signal processing unit 14, only luminance/color difference data of a rectangular area having a specific horizontal size and a specific vertical size, e.g., only luminance/color difference data of a size of 320 pixels in the horizontal direction and 240 pixels in the vertical direction is temporarily stored in the memory 17 in the read order of the image pickup element 12.

The memory 17 of the image pickup device 10 temporarily stores the charges accumulated in the image pickup element 12 as image data of one frame expressed by the luminance/color difference data having a size of 320 pixels in the horizontal direction and 240 pixels in the vertical direction.

In the computer 20, an image pickup program for performing processing for receiving one-frame image data stored in the memory 17 in the image pickup device 10 and various kinds of processing for the received image data is stored in the internal memory 26.

The image pickup program in the internal memory 26 is loaded in the main memory 25.

The main memory 25 is a memory for loading the image pickup program as described above and executing the image pickup program. The main memory 25 also serves as a memory to which image data from the image pickup device 10 is transferred.

The CPU 22 executes the image pickup program loaded in the main memory 25, so that the image processing system 100 is operated as follows.

As described above, the image data stored in the memory 17 in the image pickup device 10, i.e., the one-frame image data expressed by the luminance/color difference data having a size of 320 pixels in the horizontal direction and 240 pixels in the vertical direction is read out to the computer 20 through the I/F circuit 18 under the control of the control unit 16.

The I/F circuit 18 of the image pickup device 10 complies with the PC card (Personal Computer Memory Card) standards common to Japan and U.S.A. The I/F circuit 21 of the computer 20 also complies with the same standards.

The image pickup device 10 can exchange data with the computer 20 via the I/F circuits 18 and 21.

The image pickup device 10 does not transfer image data in units of frames, but divides the one-frame image data into a plurality of blocks and transfers blocks to the computer 20.

Note that the details of data transfer upon division of the image data will be described later.

The image data transferred from the image pickup device 10 to the computer 20 is stored in the main memory 25 of the computer 20.

For example, the image data stored in the main memory 25 is compressed and stored as a file in the storage 24.

The image pickup program will be described in more detail.

Figure 2:
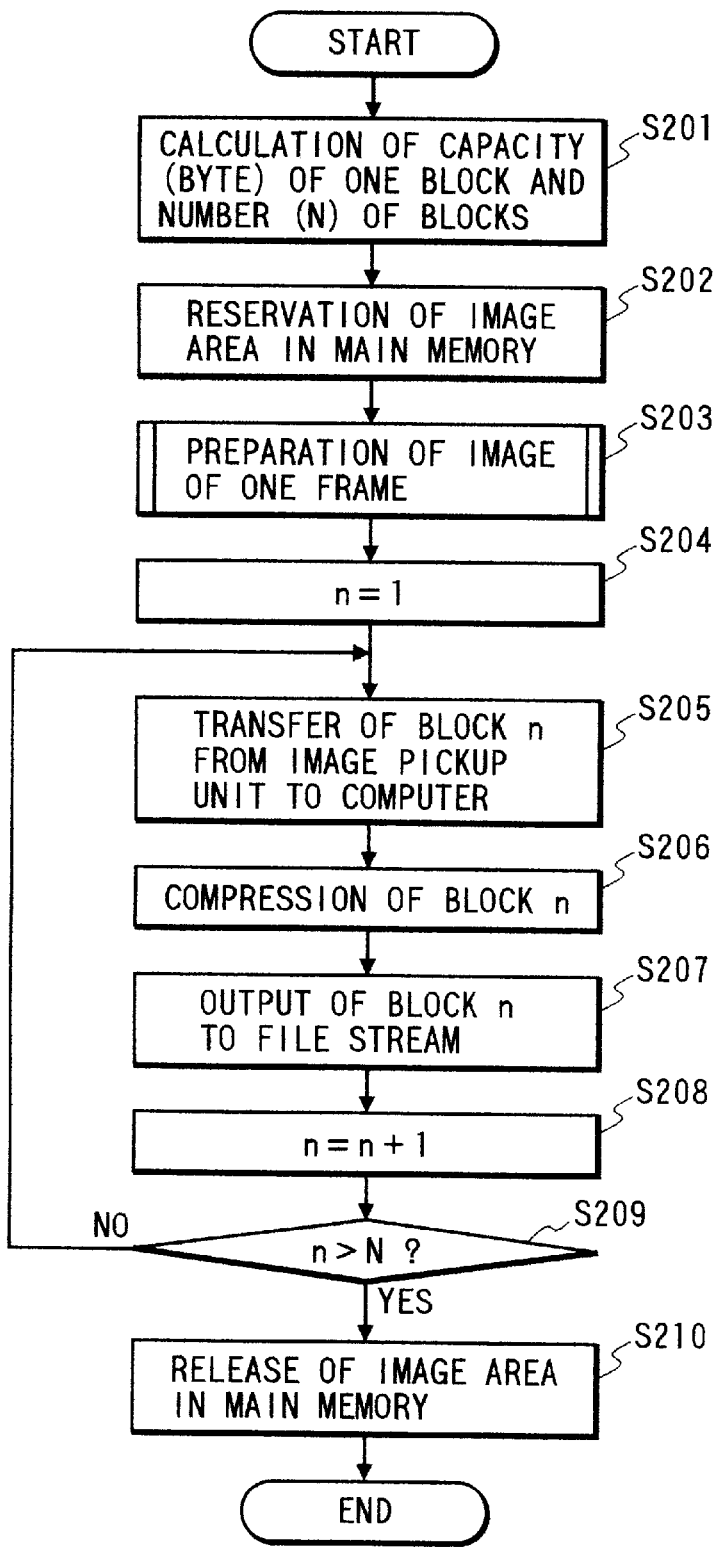
FIG. 2 is a flow chart for explaining an image pickup program executed in the image processing system.

This image pickup program is a program according to the flow chart in FIG. 2. The image pickup program is executed by the CPU 22 in the computer 20 to transfer one-frame image data stored in the memory 17 in the image pickup device 10 to the main memory 25 in the computer 20. The one-frame image data is then compressed, and the compressed data is stored as a file in the storage 24.

Figures 3, 5:
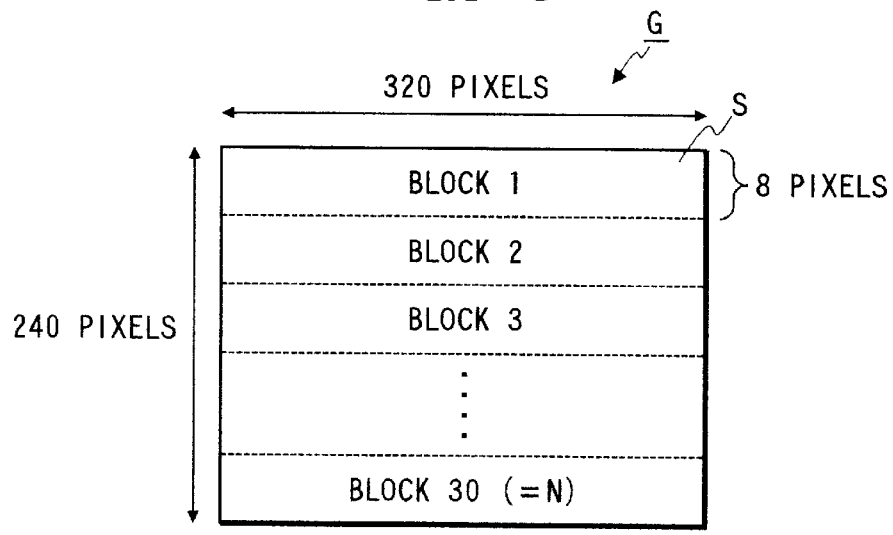
FIG. 3 is a view for explaining processing of dividing one-frame image data by the image pickup program.
FIG. 5 is a view for explaining the relationship between the one-block capacity and the number of blocks in the third embodiment.

More specifically, assume that the image processing system 100 processes one-frame image data expressed by the luminance/color difference data having a size of 320 pixels in the horizontal direction and 240 pixels in the vertical direction, as shown in FIG. 3. In this case, the capacity S (bytes) of one of a plurality of blocks obtained by dividing this image data G, and the total number N of blocks are calculated (step S201).

In FIG. 3, one block consists of 320 pixels in the horizontal direction as the number of horizontal pixels of the image and 8 pixels in the vertical direction.

When one block is defined as the size of 320 pixels in the horizontal direction and 8 pixels in the vertical direction, and one pixel is expressed by 2 bytes, the capacity S of one block is 5,120 (=320×8 ×2) bytes, and the total number N of blocks is 30.

An area having the size corresponding to the capacity S is assured as the image area in the main memory 25 (step S202).

As described above, when the one-frame image data G is stored in the memory 17 in the image pickup device 10 (step S203), steps S205 to S208 are performed for all blocks 1 to N.

As the initialization processing, an initial value (=1) is set in block number n (step S204).

The block (=block 1) of block number n (=1) is transferred from the memory 17 in the image pickup device 10 to the main memory 25 in the computer 20 (step S205).

At this time, block data transfer is performed via the I/F circuits 18 and 21 complying with the PC card standards, as described above.

The block data (=block 1) transferred to the main memory 25 is compressed by, e.g., the JPEG scheme (step S206).

This JPEG compression processes block data having a size of 8 pixels in the horizontal direction and 8 pixels in the vertical direction as one compression block data. For this reason, the block data transferred to the main memory 25, i.e., the block data having a size of 320 pixels in the horizontal direction and 8 pixels in the vertical direction is further divided into 40 blocks, thereby generating compression block data having a size of 8 pixels in the horizontal direction and 8 pixels in the vertical direction. These compression block data are sequentially compressed.

The block data (=block 1) compressed in step S206 is stored in the file open in the storage 24 through a file stream (step S207).

To process the next block (=block 2), block number n is counted up (step S208).

It is determined whether the block number obtained as a result of the count-up operation in step S208 is larger than the total number N of blocks (step S209).

That is, in step S209, it is determined whether steps S205 to S208 are performed for all blocks 1 to 30 shown in FIG. 3.

Since only processing for block 1 is performed, the determination result in step S209 becomes "false (NO)". The flow returns to processing in step S205 to execute processing for the block data (=block 2) having block number n (=2).

When steps S205 to S208 are performed for all blocks 1 to 30 of the image data G, and the determination result in step S209 becomes "true (YES)", the image area in the main memory 25 which is assured in step S202 is released, and this processing is complete.

As described above, according to the first embodiment, the one-frame image data stored in the memory 17 in the image pickup device 10 is divided into the plurality of blocks, and the blocks are then sequentially transferred to the main memory 25 in the computer 20. The image processing such as processing for storing the data in a file is performed in units of blocks. The necessary image area in the main memory 25 in the computer 20 can have a capacity of one block. A large area such as one-frame image data need not be prepared as the image area in the main memory 25 in the computer 20. Therefore, the necessary image area in the main memory 25 in the computer 20 can be reduced, and the main memory 25 can be effectively used.

It is possible to prevent the image pickup program from in execution due to the shortage of the capacity of the image area in the main memory 25 in the computer 20. Therefore, the overall performance of the image processing system 100 can be improved.

In the first embodiment described above, each block is defined to have a size of 320 pixels as the number of horizontal pixels of the image in the horizontal direction and 8 pixels in the vertical direction. However, the present invention is not limited to this. A block may have a smaller size of 8 pixels in the horizontal direction and 8 pixels in the vertical direction. Therefore, the capacity of one block can be further reduced, and the necessary image area in the main memory 25 in the computer 20 can be reduced accordingly.

In the first embodiment, the image data expressed by the luminance/color difference data is processed. However, the present invention is not limited to this. Image data in the form of R (8 bits), G (8 bits), and B (8 bits) may be processed. Therefore, the image data in the bitmap form can also be stored as a file.

The second embodiment will be described below.

In the first embodiment described above, the one-frame image data expressed by the luminance/color difference data is transferred to the computer 20 and stored in a file in the computer 20. However, in the second embodiment, for example, image data in the form of R (5 bits), G (5 bits), and B (5 bits), or image data in the pallette number form is formed into blocks, the blocks are transferred to a computer 20, and the image data are sequentially displayed on the screen of a display 23 in units of blocks.

An image processing system used in the second embodiment has an arrangement identical to that of the image processing system 100 shown in FIG. 1, and a detailed description thereof will be omitted. The following description will be made with reference to FIG. 1. Only parts different from those of the first embodiment will be described in detail below.

As described above, under the control of a control unit 16, luminance/color difference data obtained in an image pickup signal processing unit 14 obtained as described above is supplied to a conversion table 15 for converting the above data into data in the form of R (5 bits), G (5 bits), and B (5 bits), or into color numbers of 256-color pallette. Of all the output data from this conversion table 15, only the data in the form of R (5 bits), G (5 bits), and B (5 bits) in a rectangular area having a specific horizontal size and a specific vertical size, i.e., a size of 160 pixels in the horizontal direction and 120 pixels in the vertical direction is temporarily stored in a memory 17 in the read order of an image pickup element 12.

The memory 17 in an image pickup device 10 temporarily stores the charges accumulated in the image pickup element 12 as, e.g., one-frame image data expressed in the form of R (5 bits), G (5 bits), and B (5 bits) having a size of 160 pixels in the horizontal direction and 120 pixels in the vertical direction, or one-frame image data expressed in the form of pallette numbers.

The image data thus stored in the memory 17 in the image pickup device 10 is transferred to the computer 20 in accordance with, e.g., an image pickup program in accordance with the flow chart in FIG. 4.

More specifically, the image pickup program in FIG. 4 is preset in an internal memory 26 in the computer 20 in place of the image pickup program (FIG. 2) described in the first embodiment. The image pickup program in FIG. 4 is executed by the computer 20 to transfer the image data obtained by the image pickup device 10 to the computer 20. Therefore, the image data is displayed on the screen in the computer 20.

More specifically, as in the first embodiment described above, a capacity S (bytes) of one block obtained by dividing one-frame image data G into a plurality of blocks, and the total number N of blocks are calculated (step S401).

An area having a size corresponding to the capacity S is assured as an image area in a main memory 25 (step S402).

When the one-frame image data G is stored in the memory 17 in the image pickup device 10 (step S403), steps S405 to 408 are performed for all blocks 1 to N. As the initialization processing, an initial value (=1) is set in block number n (step S404).

The block (=block 1) of block number n (=1) is transferred from the memory 17 in the image pickup device 10 to the main memory 25 in the computer 20 (step S405).

The block data (=block 1) transferred to the main memory 25 is displayed in the corresponding area of the screen of the display 23 (step S406).

To process the next block (=block 2), block number n is counted up (step S407).

It is determined whether the block number obtained as a result of the count-up operation in step S407 is larger than the total number N of blocks, i.e., whether steps S405 to S407 are performed for all blocks 1 to N (step S408).

Since only processing for block 1 is performed, the determination result becomes "false (NO)" in step S408. The flow returns to processing in step S405 to execute processing for the block data (=block 2) having block number n (=2).

When steps S405 to S407 are performed for all blocks 1 to N, and the determination result in step S408 becomes "true (YES)", it is determined whether a screen display routine is completed (step S409).

When it is determined in step S409 that the screen display routine is not completed, the flow returns to step S403 to execute processing for the next one-frame image data.

When it is determined in step S409 that the screen display routine is completed, the image area in the main memory 25 which is assured in step S402 is released, and the processing is complete.

As described above, according to the second embodiment, the one-frame image data stored in the memory 17 in the image pickup device 10 is divided into the plurality of blocks, and the blocks are sequentially transferred to the main memory 25 in the computer 20. The image data is displayed on the screen in units of blocks. Even if an image obtained by the image pickup device 10 is to be displayed on the screen, the image area required for screen display can be reduced.

The third embodiment will be described below.

In the first embodiment, one block is defined in a size of 320 pixels as the number of horizontal pixels in the horizontal direction and 8 pixels in the vertical direction. However, in the third embodiment, the size of each block is changed in accordance with the empty capacity of a main memory 25 in a computer 20.

An image processing system used in the third embodiment has an arrangement identical to that of the image processing system 100 shown in FIG. 1, and a detailed description thereof will be omitted. The image processing system of the third embodiment will be described with reference to FIG. 1. Only the parts different from the first embodiment will be described in detail.

More specifically, information such as the capacity of one block and the number of blocks in processing one-frame image data expressed by the luminance/color difference data having a size of 320 pixels in the horizontal direction and 240 pixels in the vertical direction, as shown in FIG. 5, is preset in a CPU 22 in the computer 20.

The CPU 22 detects the empty space capacity of the main memory 25 and determines the size of one block in dividing one-frame image data into a plurality of blocks in accordance with the detection result using the table in FIG. 5.

More specifically, for example, when the empty space capacity of the main memory 25 is larger than 76,800 bytes and smaller than 153,600 bytes, one block is defined in a size of 320 pixels in the horizontal direction and 120 pixels in the vertical direction, and number of blocks is defined as 2.

When the empty space capacity of the main memory 25 is larger than 30,720 bytes and smaller than 76,800 bytes, one block is defined in a size of 320 pixels in the horizontal direction and 48 pixels in the vertical direction, and number of blocks is defined as 5.

As described above, the CPU 22 determines the size of each block to be processed in accordance with the empty space capacity of the main memory 25.

A sufficient image area can be assured in the main memory 25 in the computer 20, and the memory can be more effectively used.

As has been described above, according to the first aspect, in transfer of one-frame image data from an image pickup means to an image processing means, the one-frame image data is divided into a plurality of blocks, and the blocks are transferred. The image processing means temporarily stores the one-block image data in a memory means and performs predetermined image processing of the stored one-block image data. The image processing means then temporarily stores the next one-block image data in the memory means and performs predetermined image processing for this stored one-block image data. In this manner, the predetermined image processing can be performed in units of blocks. For this reason, the necessary image area can have a capacity of at least one block in the memory means in the image processing means. The necessary image area in the memory means in the image processing means can be reduced, and the memory means can be effectively used. In addition, since the necessary image area in the memory means in the image processing means can be small, various kinds of information stored in other areas can be properly retained. A high-performance image pickup system can be obtained. For example, in a system in which an image pickup program is preset in the main memory in the computer and executed by the computer to transfer the image data from the image pickup device to the computer, when the image data is to be transferred from the image pickup device to the computer, one-frame image data is divided into a plurality of blocks, and the blocks are transferred, thereby reducing the necessary image area in the main memory in the computer. In addition, in execution of the image pickup program due to the shortage of the empty capacity of the main memory can be eliminated.

According to the second aspect, the image pickup means and the image processing means in the first aspect are connected via a communication means complying with PC card standards. The image processing means can be applied to various kinds of input/output devices such as a personal computer. Since the image pickup means and the image processing means are connected via the communication means complying with the PC card standards for a variety of notebook personal computers and portable terminals, an image pickup system as a combination of each of these terminals and the image pickup means can be realized. In addition, since the data transfer rate can increase, the processing speed of the entire system can increase, thereby improving the processing performance.

According to the third aspect, rectangular blocks each having an integer multiple of 8 pixels in a horizontal direction and 8 pixels in a vertical direction are transferred from the image pickup means to the image processing means in the first aspect. The necessary image area in the memory means in the image processing means can have a capacity of one of the rectangular blocks each having an integer multiple of 8 pixels in the horizontal direction and 8 pixels in the vertical direction. Therefore, the necessary image area in the memory means in the image processing means can be reduced, and the memory means can be effectively used.

According to the fourth aspect, rectangular blocks each having the number of horizontal pixels of the one-frame image data in a horizontal direction and an integer multiple of 8 pixels in a vertical direction are transferred from the image pickup means to the image processing means in the first aspect. The necessary image area in the storage means in the image processing means can have a capacity of one of the rectangular blocks each having the number of horizontal pixels of the one-frame image data in a horizontal direction and an integer multiple of 8 pixels in a vertical direction. Therefore, the necessary image area in the memory means in the image processing means can be reduced, and the memory means can be effectively used.

According to the fifth aspect, after the one-block image data is transferred to the image processing means and before the next block image data is transferred to the image processing means, the image data of the block transferred by the storage means in the image processing means is stored in the memory in the first aspect. The image area required for storage processing in the memory means in the image processing means can have a capacity of at least one block. Therefore, the necessary image area in the memory means in the image processing means can be reduced, and the memory means can be effectively used.

According to the sixth aspect, compressed image data is stored in the memory in the fifth aspect, thereby reducing the memory data amount of the memory.

According to the seventh aspect, after the one-block image data is transferred to the image processing means and before the next block image data is transferred to the image processing means, the image data of the block transferred to a display means in the image processing means is displayed on the screen in the first aspect. The image area required for screen display processing in the memory means in the image processing means can have a capacity of at least one block. Therefore, the necessary image area in the memory means in the image processing means can be reduced, and the memory means can be effectively used.

According to the eighth aspect, the size of each block transferred from the image pickup means to the image processing means in the first aspect is changed in accordance with the empty space capacity of the memory means in the image processing means. Therefore, the size of the necessary image area in the memory means in the image processing means can be appropriately set.

According to the ninth aspect, in transfer of one-frame image data from an image pickup means to an image processing means by executing a transfer control processing step, the one-frame image data is divided into a plurality of blocks, and the blocks are transferred. The image processing means temporarily stores the one-block image data in a memory means and performs predetermined image processing of the stored one-block image data. The image processing means then temporarily stores the next one-block image data in the memory means and performs predetermined image processing for this stored one-block image data. In this manner, the predetermined image processing can be performed in units of blocks. For this reason, the necessary image area can have a capacity of at least one block in the memory means in the image processing means. The necessary image area in the memory means in the image processing means can be reduced, and the memory means can be effectively used. In addition, since the necessary image area in the memory means in the image processing means can be small, various kinds of information stored in other areas can be properly retained. A high-performance image pickup system can be obtained. For example, in a system in which an image pickup program is preset in the main memory in the computer and executed by the computer to transfer the image data from the image pickup device to the computer, when the image data is to be transferred from the image pickup device to the computer, one-frame image data is divided into a plurality of blocks, and the blocks are transferred, thereby reducing the necessary image area in the main memory in the computer. In addition, in execution of the image pickup program due to the shortage of the empty space capacity of the main memory can be eliminated.

According to the tenth aspect, the image pickup means and the image processing means in the ninth aspect are connected via a communication means complying with PC card standards. The image processing means can be applied to various kinds of input/output devices such as a personal computer. Since the image pickup means and the image processing means are connected via the communication means complying with the PC card standards for a variety of notebook personal computers and portable terminals, an image pickup system as a combination of each of these terminals and the image pickup means can be realized. In addition, since the data transfer rate can be increased, the processing speed of the entire system can increase, thereby improving the processing performance.

According to the eleventh aspect, rectangular blocks each having an integer multiple of 8 pixels in a horizontal direction and 8 pixels in a vertical direction are transferred from the image pickup means to the image processing means in the ninth aspect. The necessary image area in the memory means in the image processing means can have a capacity of one of the rectangular blocks each having an integer multiple of 8 pixels in the horizontal direction and 8 pixels in the vertical direction. Therefore, the necessary image area in the memory means in the image processing means can be reduced, and the memory means can be effectively used.

According to the twelfth aspect, rectangular blocks each having the number of horizontal pixels of the one-frame image data in a horizontal direction and an integer multiple of 8 pixels in a vertical direction are transferred from the image pickup means to the image processing means in the ninth aspect. The necessary image area in the storage means in the image processing means can have a capacity of one of the rectangular blocks each having the number of horizontal pixels of the one-frame image data in a horizontal direction and an integer multiple of 8 pixels in a vertical direction. Therefore, the necessary image area in the memory means in the image processing means can be reduced, and the memory means can be effectively used.

According to the thirteenth aspect, after the one-block image data is transferred to the image processing means and before the next block image data is transferred to the image processing means, the image data of the block transferred by the storage means in the image processing means is stored in the memory in the ninth aspect. The image area required for storage processing in the memory means in the image processing means can have a capacity of at least one block. Therefore, the necessary image area in the memory means in the image processing means can be reduced, and the memory means can be effectively used.

According to the fourteenth aspect, compressed image data is stored in the memory in the thirteenth aspect, thereby reducing the memory data amount of the memory.

According to the fifteenth aspect, after the one-block image data is transferred to the image processing means and before the next block image data is transferred to the image processing means, the image data of the block transferred to a display means in the image processing means is displayed on the screen in the ninth aspect. The image area required for screen display processing in the memory means in the image processing means can have a capacity of at least one block. Therefore, the necessary image area in the memory means in the image processing means can be reduced, and the memory means can be effectively used.

According to the sixteenth aspect, the size of each block transferred from the image pickup means to the image processing means in the ninth aspect is changed in accordance with the empty capacity of the memory means in the image processing means. Therefore, the size of the necessary image area in the memory means in the image processing means can be appropriately set.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup system comprising
   an image pickup device adapted to pick up an object image to obtain image data,
   an image processing device, adapted to temporarily store the image data transferred from said image pickup device in a memory device and performing predetermined image processing for the image data; and
   a transfer control device adapted to control data transfer between said image pickup device and said image processing device, wherein said transfer control device divides one-frame image data obtained by said image pickup device into a plurality of blocks and transferring a block to said image processing means,
   wherein said transfer control device comprises a device adapted to detect a capacity of an empty area of said memory device and changes a size of the block in accordance with, a detection result from said detection device.

2. A system according to claim 1, wherein said communication device complies with PC card standards.

3. A system according to claim 1, wherein said transfer control device divides the one-frame image data into rectangular blocks each having an integer multiple of 8 pixels in a horizontal direction and 8 pixels in a vertical direction.

4. A system according to claim 1, wherein said transfer control device divides the one-frame image data into rectangular blocks each having the number of horizontal pixels of the one-frame image data in a horizontal direction and an integer multiple of 8 pixels in a vertical direction.

5. A system according to claim 1, wherein said image processing device comprises a display device adapted to store the image data from said image piece device in a memory, and said transfer next image data to said image processing device when said image processing device and said storage device completes storage in said memory.

6. A system according to claim 5, wherein said storage device stores the image data upon compression of the one-block image data.

7. A system according to claim 1, wherein said image processing device comprises a display device adapted to display the image data from said image pickup device on a screen, and said transfer control device controls to transfer next image data to said image processing device when said image processing device temporarily stores the one-block image data in said memory device and the image data is displayed on a screen of said display device.

8. A storage medium which stores a transfer control processing step for transferring image data obtained by picking up an object image by an image pickup device to a memory device of an image processing device connectable to said image pickup device through a communication device, temporarily storing the image processing device to perform predetermined image processing, wherein said transfer control processing step includes a processing step of dividing one-frame image data obtained by said image pickup device into a plurality of blocks and transferring a block to said image processing device, wherein said transfer control processing step includes a detection step of detecting a capacity of an empty area of said memory device and a changing step of changing a size of one block in accordance with a detection result in said detection step.

9. A medium according to claim 8, wherein said transfer control processing step includes a processing step of causing said communication device complying with PC card standards to transfer the image data.

10. A medium according to claim 8, wherein said transfer control processing step includes a processing step of dividing the one-frame image data into rectangular blocks each having an integer multiple of 8 pixels in a horizontal direction and 8 pixels in a vertical direction.

11. A medium according to claim 8, wherein said transfer control processing step includes a processing step of dividing the one-frame image data into rectangular blocks each having the number of horizontal pixels of the one-frame image data in a horizontal direction and an integer multiple of 8 pixels in a vertical direction.

12. A medium according to claim 8, wherein said transfer control processing step includes a processing step controlling to transfer next image data to said image processing device when said image processing device temporarily stores the one block image data in said memory device and storage in said memory by said storage device is completed.

13. A medium according to claim 12, wherein said transfer control processing step includes a processing step of storing the image data upon compression of the one-block image data by said storage device.

14. A medium according to claim 8, wherein said transfer control processing step includes a processing step of controlling to transfer next image data to said image processing device when said image processing device temporarily stores the one-block image data in said memory device and the image data is displayed on the screen of a display device.

* * * * *

UNITED STATES PATENT AND TRADEMARK OFFICE
CERTIFICATE OF CORRECTION

PATENT NO. : 6,433,820 B1
DATED : August 13, 2002
INVENTOR(S) : Yuji Koide et al.

It is certified that error appears in the above-identified patent and that said Letters Patent is hereby corrected as shown below:

Column 4,
Line 10, "processing, unit" should read -- processing unit --

Column 6,
Line 61, "in execution" should read -- inexecution --

Column 9,
Line 47, "in execution" should read -- inexecution --

Column 11,
Line 16, "in execution" should read -- inexecution --

Column 12,
Line 45, "size of the block" should read -- size of one block --

Signed and Sealed this

Twenty-fifth Day of February, 2003

JAMES E. ROGAN
*Director of the United States Patent and Trademark Office*